May 6, 1930.  L. E. WEBSTER  1,757,693
SHOVEL HANDLE
Filed Dec. 27, 1920
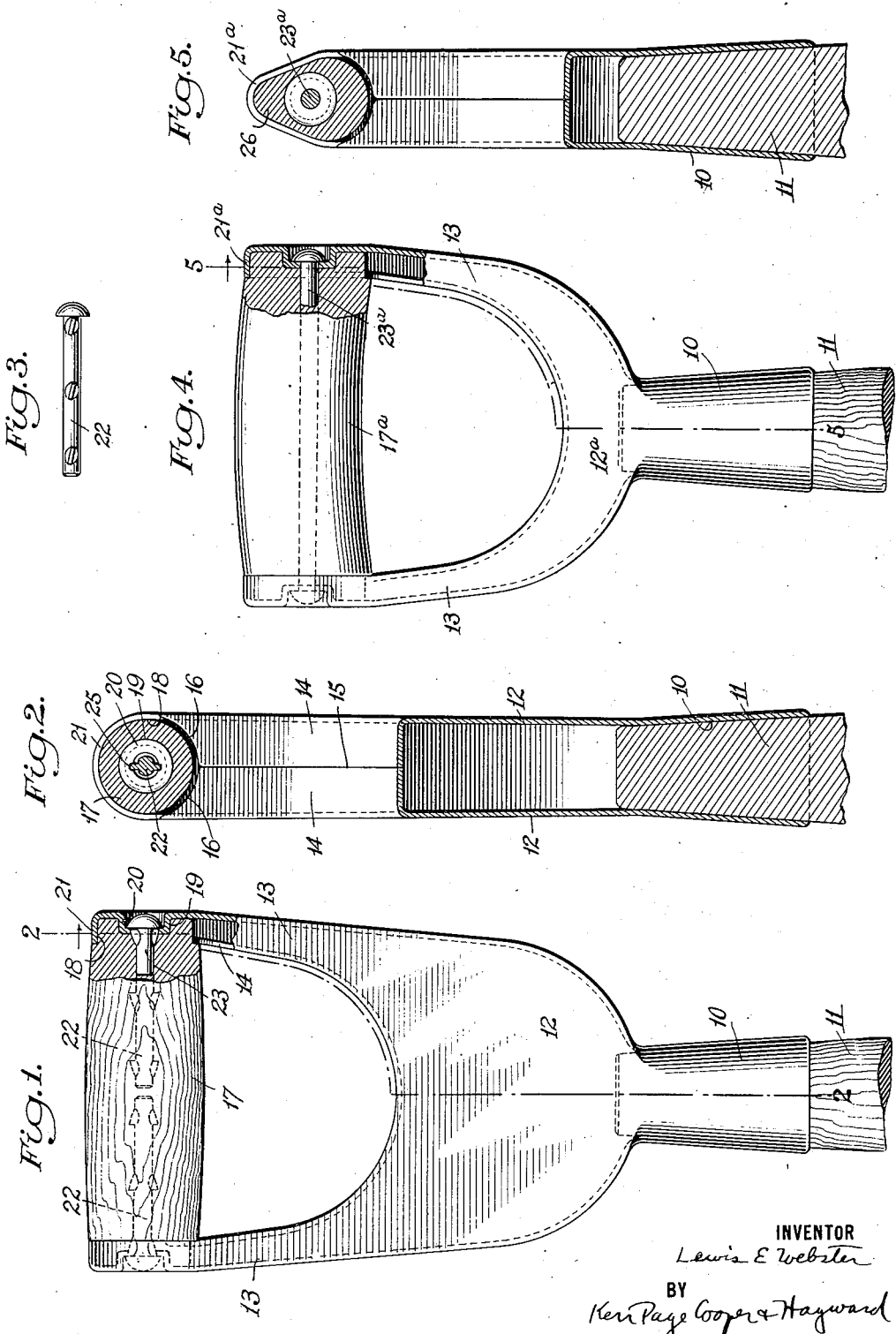
INVENTOR
Lewis E Webster
BY
Kerr Page Cooper & Hayward
ATTORNEYS Patented May 6, 1930

1,757,693

UNITED STATES PATENT OFFICE

LEWIS E. WEBSTER, OF WYOMING, PENNSYLVANIA, ASSIGNOR, BY MESNE ASSIGNMENTS, TO COLUMBUS HANDLE & TOOL CORPORATION, OF COLUMBUS, INDIANA

SHOVEL HANDLE

Application filed December 27, 1920. Serial No. 433,257.

This invention relates to improvements in shovel handles and more particularly to shovel handles of D type formed from sheet metal.

In the shovel making art it has been the practise to form the D handle of the shovel from wood, preferably well seasoned ash. The configuration of the D handle is such that there is considerable waste of wood in the process of forming these handles, and much labor is required in forming them.

It is one of the objects of my invention to provide a sheet metal handle which will cut down the waste of this wood and also reduce the cost of the handle.

Previous attempts have been made to provide metallic handles for shovels and like tools. These former handles have not been satisfactory inasmuch as they had certain characteristics which distinguished them from the usual wooden D handle. Among these may be mentioned the difference in weight and contour, the provision of an open flanged construction for the side arms of the D handle, the use of metallic grips which chill the laborers' hands in cold weather and rotation of the grip relatively to the body portion of the handle. This latter characteristic is particularly objectionable to shovel users since it largely diminishes the "purchase" or leverage which the laborer can secure upon the shovel over that which he can secure with the solid wooden D handle having a unitary grip portion.

It is among the objects of the present invention to provide a shovel handle of sheet metal which will retain the desired and well known characteristics of the solid wooden D handle so as to be equally satisfactory to the user.

Other objects reside in the provision of a shovel handle which will be simple, inexpensive to manufacture and assemble, and which will stand up under severe usage.

Other objects and advantages will be pointed out in the accompanying specification and claims, and shown in the drawings, in which Fig. 1 shows an elevational view of my improved handle.

Fig. 2 is a side sectional view taken on line 2—2 of Fig. 1 and looking in the direction of the arrows.

Fig. 3 shows a detail view of the slotless screw utilized to retain the wooden grip of the handle shown in Fig. 1 in position.

Fig. 4 shows a modified form of handle having a shallower flat portion and with a tamping grip portion.

Fig. 5 shows a sectional view of the handle shown in Fig. 4, the section being taken on line 5—5.

As shown in the drawings, 10 indicates the tubular seamless longitudinally edgeless shank open at the bottom to receive the wooden shank 11 which is secured thereto in any suitable manner as by rivets not shown. The tubular shank portion is formed from a single piece of sheet metal by one or more so-called deep drawing portions. Integral with the shank and extending upwardly therefrom the sheet metal is extended to form the flat portion 12, which corresponds in contour to the corresponding part of a wooden D handle.

The flat portion is of hollow box section as shown in Fig. 2. Extending upwardly and integral with the flat portion are the spaced arms or prongs 13. These parts are likewise of hollow box section having the flanged edges 14 turned inwardly and brought into abutting relation as clearly shown in Fig. 2, at 15. These abutting parts serve to close in the former channel like contour of the prongs and the open top of the flat portion, and thereby form a closed wall for the interior of the D opening. The upper edges of these flanges are cut away with an arcuate contour as shown at 16 in Fig. 2, so that when bent inwardly they closely conform to the round contour of the wooden grip 17. This wooden grip is preferably made of well seasoned ash with the grain running lengthwise thereof. Each grip is provided with a pair of annular grooves 18 and is cupped with cylindrical holes 19 in the ends thereof. The outside edge portions of the arms are provided with indented bosses 20 which closely fit the holes 19 in the grip. The edge portions 21 of the arms above the end of the arcuate cut-away portions 16 are turned over and are of curved contour to closely fit in the grooves 18 of the wooden grip and thereby produce a smooth contour of the completed handle.

The grip while securely held in position in the sheet metal body is still subject to rotation relatively thereto. To prevent this objectionable rotation I provide the grip with the slotless screws 22 shown in detail in Fig. 3. The screws form the subject matter of a separate application. It is here sufficient to state that the grip handle is first drilled as at 23 to receive the shank portion of the screws. The sheet metal bosses are likewise pierced, as shown in Fig. 2, to permit the entrance of the shank portion of the screws and are slotted at 25 to permit the screw portions to pass through the sheet metal. The slotless screws are hammered or otherwise forced into position in the wooden grip, the screw portions meantime rotating and cutting a spiral path in the wood. Eventually the last screw portions register with the slots 25 and thereafter act as keys to prevent further rotation of the grip. The countersunk portions of the bosses 20 provide a suitable recess for the ends of the screws, and prevent the users' hands from being torn thereby.

The handle described, with the exception of the desirable wooden grip and the locking screws, is formed of a single piece of sheet metal. The contour of the completed handle is substantially identical with wooden handles now in use and by a proper selection of gauge of the metal the weight of the handle may be made to conform with the weight of wooden D handles.

The shovel handle shown in Figs. 4 and 5 is in general of the same construction as the handle previously described. I, however, here show a D handle with a somewhat shorter flat portion 12ª. This handle is also provided with a grip which is particularly adapted for use in tamping. The grip 17ª is here shown as formed from a casting. This grip is provided with a top of wedge shaped contour as shown at 26 and in place of the slotless screws I provide a continuous rivet 23ª. Rotation of the grip is prevented by reason of the V-shaped contour thereof and the V-shaped contour of flanges 21ª.

I claim:

1. A shovel handle including a body portion formed from a single piece of sheet metal, having a seamless longitudinally edgeless shank portion and a pair of spaced arm portions of hollow box like section, a wooden grip extending between said arm portions, and means extending into the interior of said grip and engaging the fibre thereof and slots in the metal of the arm portions engaged by said means for preventing rotation of the grip relatively to the body portion of the handle.

2. A shovel handle including a body portion formed from a single piece of sheet metal having a seamless longitudinally edgeless shank portion and a pair of spaced arm portions, said arm portions having indented bosses thereon, a wooden grip extending across the space between the said arms and fitting said bosses at its ends, and insertable means adapted to be driven into the wood of said grip having portions extending through and engaging said arms for preventing the rotation of the grip.

3. A shovel handle formed from a single piece of sheet metal and comprising a seamless longitudinally edgeless shank portion, and a pair of spaced arm portions, a grip extending between said arm portions, said arm portions having their edges turned in toward each other and abutting at their terminal edges against each other to thereby form a closed wall around the D opening, said turned in portions having their upper edges cut away arcuately to substantially conform to the curvature of the grip.

4. A shovel handle having a body formed from a single piece of sheet metal and including a shank portion, a flat base portion and a pair of spaced arm portions, said arm portions being free of projecting sharp edged portions and having a hollow box-like closed section, a grip extending between the arm portions, said arm portions having the end portions thereof bent over and curved to conform to the curvature of the grip.

5. A shovel comprising a body portion and a grip portion, said body portion being formed from a single piece of sheet metal and having a shank portion and a pair of spaced arm portions, said grip extending between said arms, said arms having the edges thereof turned in toward each other and abutting at their terminal edges against each other to define an upper inner continuous interior wall of the D handle, said turned in portions at their upper edges being arcuately cut away to conform to the curvature of the grip, the end portions of said arms being bent over the edges of the grip and curved to correspond thereto.

6. A shovel handle comprising a body portion and a grip, said body portion being formed from a single piece of sheet metal and having a shank portion and a pair of spaced arm portions, indented bosses on said arm portions, said grip extending between the arms and being cupped to receive said bosses, said arm portions having the end edges thereof bent over and curved to correspond with the contour of the grip, and slotless screw devices extending endwise into the grip through and engaging the depressed bosses to prevent relative rotation of the grip and body portion.

7. A shovel handle comprising a body portion and a grip, said body portion being formed from a single piece of sheet metal and having a shank portion and a pair of spaced arm portions, indented bosses on said arm portions, said grip extending between the arms and being cupped to receive said bosses, said arm portions having the end edges thereof bent over and curved to correspond with the contour of the grip, and reinforcing means extending into the grip and terminating in a head portion disposed in the recess formed by the depressions of the boss.

8. A shovel handle including a sheet metal body portion having a shank portion and a pair of spaced arm portions, a wooden grip extending between said arm portions and slotless screw devices extending into the interior of the grip and engaging the fibre thereof and the metal of the arm portions to prevent relative rotation of the grip relatively to the body portion of the handle.

9. A sheet metal D handle head formed with a shank portion constituting a stale socket and two tubular arms diverging upwardly and provided at their upper ends with opposed grip receiving sockets, said arms being of tapering cross section largest at their portions nearest the stale socket.

10. A sheet metal D shovel handle comprising a shank portion to receive a handle and a pair of spaced and diverging tubular arm portions, said tubular arm portions at their upper ends being shaped to form opposing cups to receive a grip, a grip extending between said cups, said arm portions being of hollow box-like cross section with the longitudinal terminal edges turned in and abutting together to form a closed wall around the D opening and to complete the closing and forming of the box-like section of the hollow tubular arms.

11. A sheet-metal D-handle head, formed with a stale socket, and two tubular arms diverging from said stale-socket and provided at their other ends with opposed grip-receiving sockets, said arms being of tapering cross-section largest near the stale-socket.

In testimony whereof I hereto affix my signature.

LEWIS E. WEBSTER.